United States Patent [19]

Champagne

[11] Patent Number: 4,881,718
[45] Date of Patent: Nov. 21, 1989

[54] BALL CONTROL VALVE

[75] Inventor: Raymond P. Champagne, Coventry, R.I.

[73] Assignee: Jamesbury Corporation, Worchester, Mass.

[21] Appl. No.: 125,979

[22] Filed: Nov. 27, 1987

[51] Int. Cl.$^4$ .......... F16K 47/04; F16K 5/06; F16K 5/10
[52] U.S. Cl. .................. 251/209; 251/315; 251/316; 251/368
[58] Field of Search .............. 251/208, 209, 315, 316, 251/368

[56] References Cited

U.S. PATENT DOCUMENTS

| | | | |
|---|---|---|---|
| 2,510,514 | 6/1950 | Mueller | 251/209 |
| 3,354,904 | 11/1967 | Federle et al. | |
| 3,520,513 | 7/1970 | Okerblom | |
| 3,536,296 | 10/1970 | Burris | |
| 3,722,545 | 3/1973 | Furlani | |
| 3,762,682 | 10/1973 | Franck | 251/209 X |
| 3,773,291 | 11/1973 | Grauer | 251/209 X |
| 3,812,882 | 5/1974 | Taylor | 251/208 X |
| 4,131,128 | 12/1978 | Gotzenberger | |
| 4,212,321 | 7/1980 | Hulsey | |
| 4,388,945 | 6/1983 | Johnson et al. | |

Primary Examiner—Arnold Rosenthal
Attorney, Agent, or Firm—Oblon, Spivak, McClelland, Maier & Neustadt

[57] ABSTRACT

A ball valve with a port (30) through the ball (26) has a groove associated with each end of the port with each groove (32,34) extending partially around the circumference of the ball. Each groove connects with its end of the port (30) and extends away from the port in the plane of rotation of the ball. The grooves decrease in size as they extend away from the port whereby the grooves serve to control the flow area depending on the degree of rotation of the ball. Diffusers (22,24) in the inlet and outlet of the valve assure that any cavitation will occur within the diffusers which are formed of material adapted to withstand the cavitation forces.

1 Claim, 4 Drawing Sheets

BALL CONTROL VALVE

BACKGROUND OF THE INVENTION

1. Field of the Invention

This invention relates to ball control valves and more particularly to a ball valve for more precise control of flow over a broad range of flows and at high pressure drops.

2. Discussion of the Background

There are many applications for valves which dictate the use of a ball valve and which require precise flow control over a broad range. For example, in enhanced oil recovery projects where steam or heated water is injected into wells in order to increase the flow of oil, it is desirable to adjust the down-hole pressure head by controlling the pressure drop across a valve. It is characteristic for this pressure drop to be very high requiring a valve with fine control and resistance to the potentially destructive effects of the high flow rates. However, it is also desirable to provide unrestricted passage for full flow. Prior art ball control valves are not suitable to control the flow rate a precisely as required at the flow rates and pressure drops encountered. There are many examples of prior art ball control valves described in technical publications and the patent literature such as the following U.S. Pat. Nos.: 3,520,513; 3,354,904; 3,722,545; 3,762,682; 4,131,128; and 4,212,321. Known ball control valves, many of which are commercially available, are not capable of achieving all of the desired features of fine control, resistance to erosion and cavitation, an adjustment for unobstructed full flow, bi-directionality and flow shutoff.

SUMMARY OF THE INVENTION

The valve of the present invention is basically a ball valve whose spherical surface engages an annular valve seat and with the ball having a port therethrough. A groove is associated with each end of the port with each groove extending into the surface of the ball and extending partially around the circumference of the ball in a specified direction. Each groove connects to its respective end of the port and extends away from that port generally in the plane of rotation of the ball. The grooves are generally large adjacent to the port and decrease in size (width and/or depth) as they extend away from and around the ball surface. When the port is in alignment with the inlet and outlet, the flow is at a maximum. As the ball is turned such that the flow must go through the grooves to enter and exit the port, the flow is reduced depending on the degree of rotation of the ball and, therefore, the flow area provided through each groove.

DESCRIPTION OF THE PREFERRED EMBODIMENT

Figure 1:
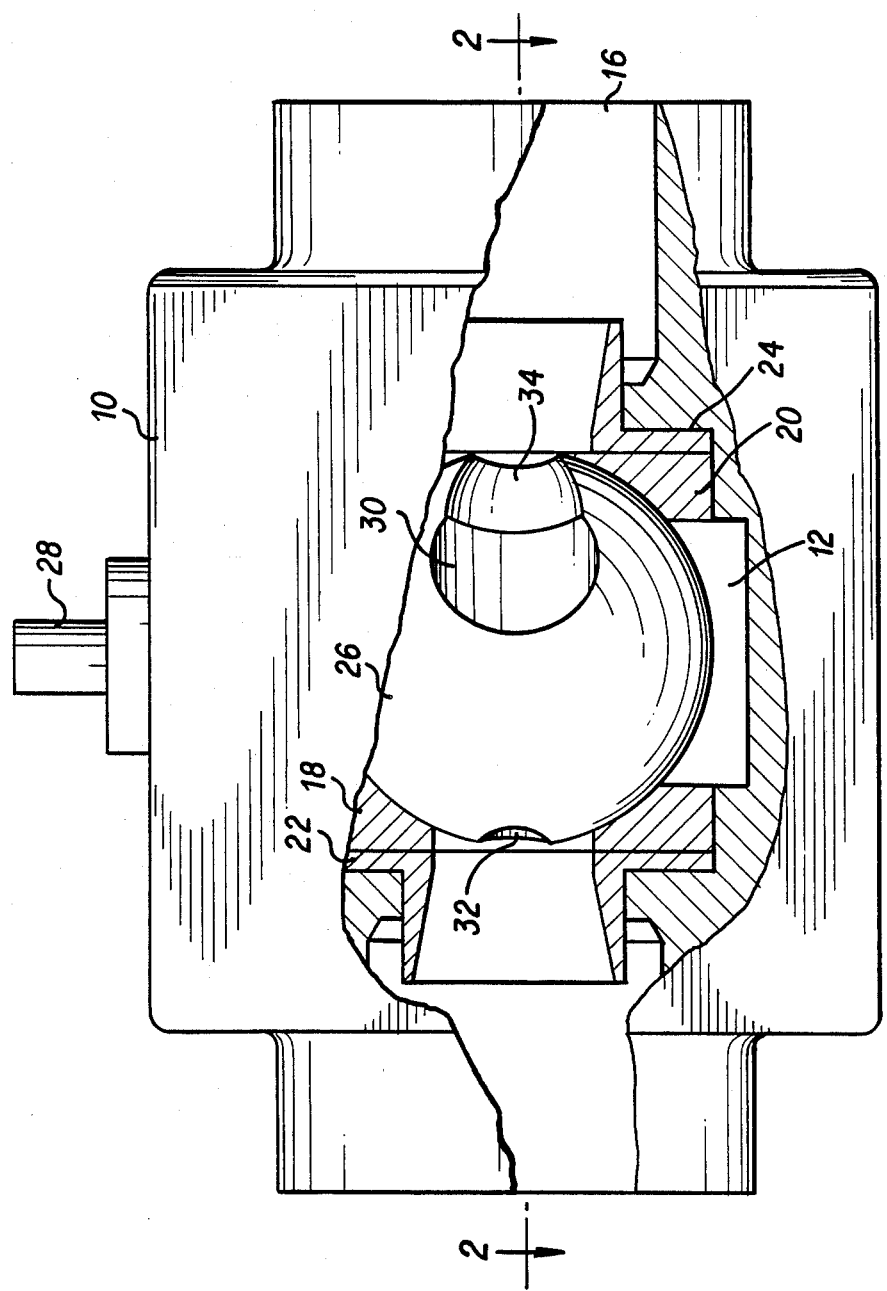
FIG. 1 is a partial cut-away side view of a ball valve according to the present invention.

Referring to the drawings, there is shown in FIG. 1 a valve body or housing 10 having a ball chamber 12 and flow conduits designated 14 and 16. Flow may be in either direction so that 14 and 16 may either be the inlet or outlet. Mounted in the valve housing 10 between the ball chamber 12 and the conduits 14 and 16 are the valve seats 18 and 20 and the diffusers 22 and 24. Rotatably mounted in the ball chamber 12 is the spherical ball valve member 26 which is in sealing contact with the valve seats 18 and 20 and which is rotatable by means of the actuator shaft 28. The actual valve body 10 would be constructed in any one of many conventional configurations so that the valve and its internal components can be readily assembled and disassembled.

Figure 2:
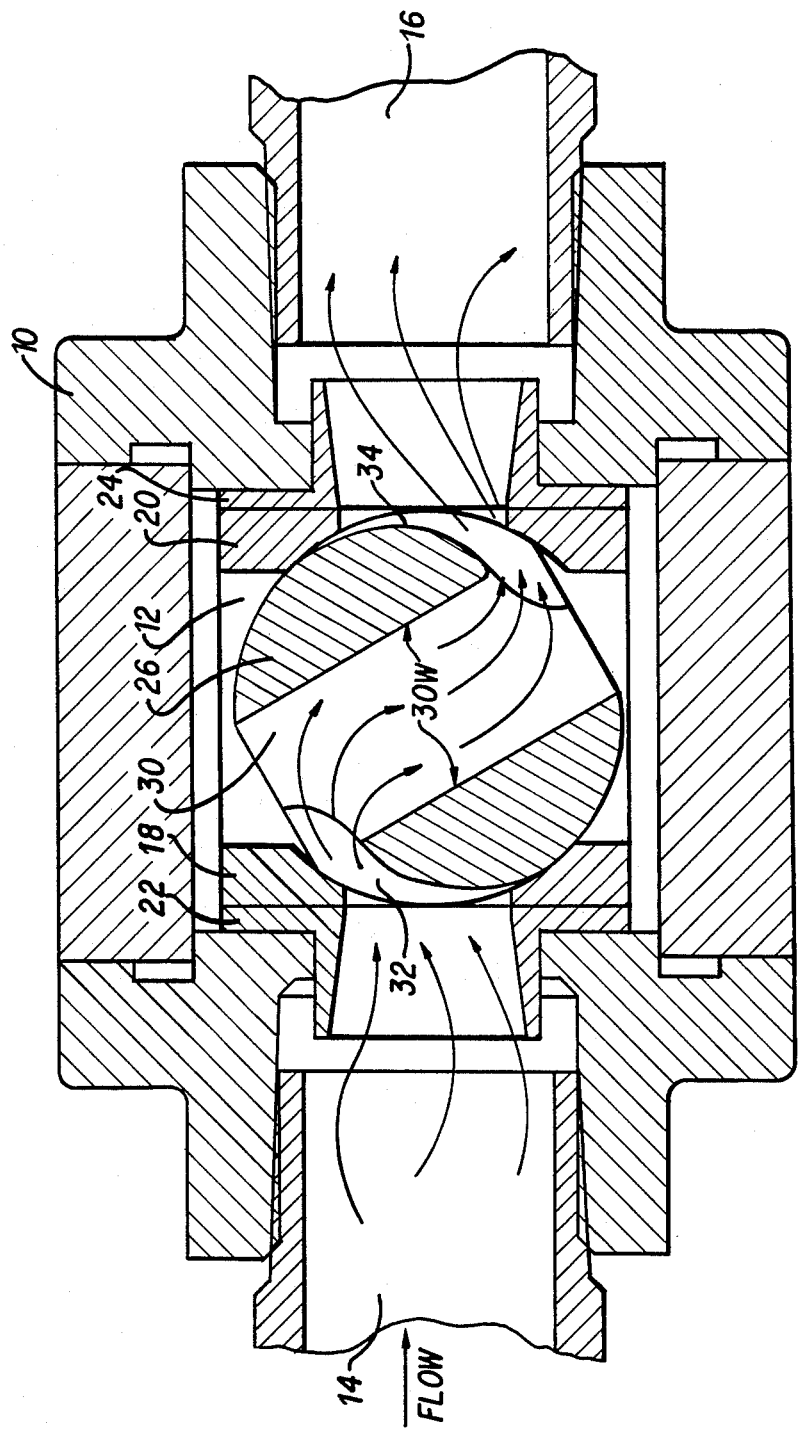
FIG. 2 is a cross-section view along line 2—2 of FIG. 1 with the valve in the partially open position.
Figure 3:
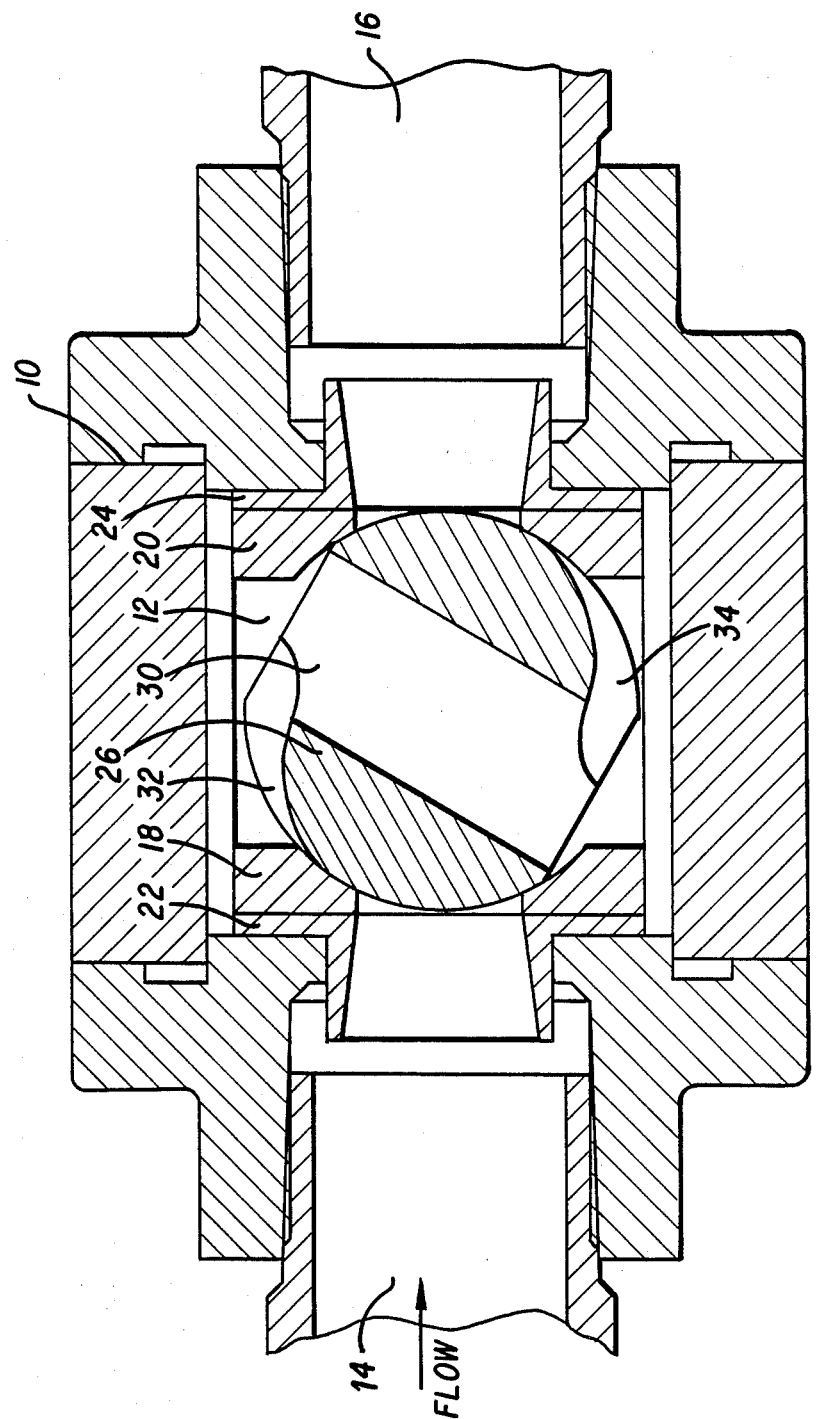
FIG. 3 is a cross-section view similar to FIG. 2 but with the valve in the closed position.

Referring now in more detail to the spherical ball valve member 26 and to FIGS. 1, 2 and 3, the ball 26 contains a port 30 extending through the diameter of the ball perpendicular to the actuator shaft 28 and the axis of rotation of the ball. The port 30 is thus adapted to provide a flow path through the ball 26 between the conduits 14 and 16 when the ball 26 is rotated to at least partially align the port with the conduits.

Formed into the surface of the spherical ball valve member are elongated grooves or notches 32 and 34. These grooves are adjacent to and connected with their respective end of the port 30. Each groove extends from the port 30 partially around the circumference of the ball in a common direction away from its adjacent port end and in the plane of rotation of the ball. At the point of connection of the grooves with their respective port end wall portion 30W, the grooves have a selected depth and width with the depth and/or the width decreasing as the grooves extend away from the port end wall portion 30W around the circumference. Therefore, the grooves have a certain area for fluid flow at the end thereof adjacent to the port end with this area for fluid flow decreasing as the grooves extend away from the port end and the depth and/or width decreases.

The ball valve depicted in FIG. 2 illustrates the ball in the partially open position. The fluid flows, for example, into the valve through conduit 14 and into the diffuser 22 which causes a slight pressure reduction. The fluid must then flow through notch 32 in order to enter the port 30. The port 30 in this position is not itself aligned fully or even partially with the conduits 14 and 16. This means that the only fluid path through the valve is provided by the grooves 32 and 34 and is controlled by the degree of rotation of the ball and the position of the grooves with respect to the conduits 14 and 16. As the ball is rotated, either a greater or a lesser flow area through the grooves will be provided. FIG. 3 depicts the valve in the fully closed position where neither the port nor any portion of the grooves is aligned with the conduits. The spherical ball surface is in contact with the valve seats 18 and 20 and the spherical surface closes off the conduits 14 and 16.

Figure 4:
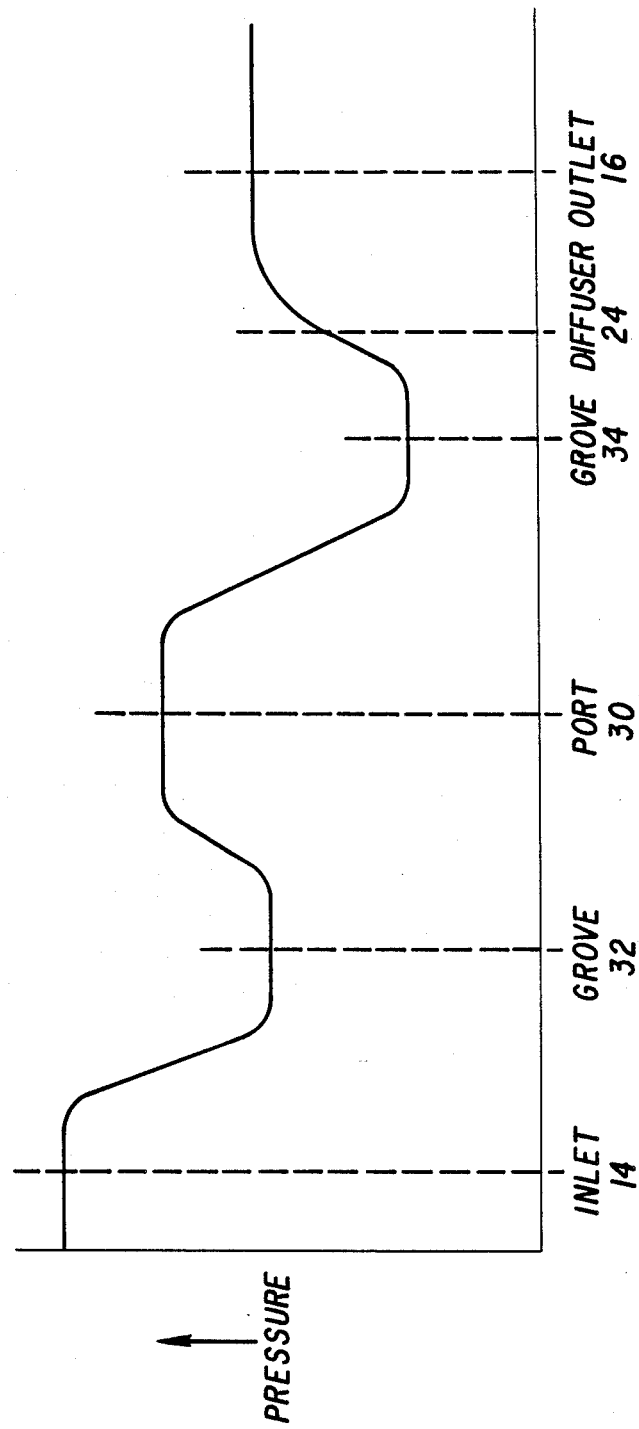
FIG. 4 is a graphical representation illustrative of the pressure levels as fluid passes through the valve.

FIG. 4 shows the characteristic pressure levels as the fluid passes through the valve at the various positions indicated. The flow is controlled by the areas between the grooves 32 and 34 and the valves seats 18 and 20 upon entering and leaving the ball port as can be seen in FIG. 4. Therefore, the flow control is exerted through a distinct double pressure drop; one at the ball inlet and the second at the ball outlet. The grooves 32 and 34 may be designed to provide various relationships between the valve flow co-efficient and the valve position. For example, these relationships can include those such as equal percentage or linear. By selecting the ball port diameter and the groove sizing, the controlling angular stroke of the valve can vary up to nearly 180 degrees. As the valve is closed, the flow path becomes more tortuous which causes a more permanent pressure loss and lower recovery and allows a higher differential pressure through the valve.

The diffusers 22 and 24 act to channel the flow and combat erosive forces. Cavitation occurs in a liquid when the pressure is dropped below the vapor pressure thus forming gas bubbles in the liquid. When the liquid is then recompressed above the vapor pressure, the gas bubbles collapse and release potentially damaging shock waves. This condition is illustrated in FIG. 4. If cavitation is going to occur in the valve of the present invention, it will take place in the diverging outlet diffuser 24 where the pressure is recovering from its lowest level at the inlet to the diffuser. Another effect of the diffuser in combination with the grooves is that cavitation will be forced toward the center line of the diffuser rather than along the walls of the piping as in a normal partially open ball valve. This will reduce the level of damage to the valve components due to cavitation. Furthermore, the diffusers are designed to counteract the effects of cavitation in the event that a liquid is the flow media. The diffusers are press-fit in the valve and are replaceable and may be of a hard material (harder than the valve body or housing) such as stellite. Furthermore, since the valve and its components are symmetrical, the valve will operate and shut off and seal with flow in either direction.

I claim:
1. A precision fluid control ball valve comprising:
    (a) a valve housing defining an inlet conduit, a ball chamber and an outlet conduit;
    (b) an annular valve seat surrounding each of said inlet and outlet conduits;
    (c) a spherical ball valve member mounted in said ball chamber for rotation about an axis and in engagement with said valve seats;
    (d) means for rotating said spherical ball valve member about said axis;
    (e) said spherical ball valve member comprising:
        (1) a ball port extending through said spherical ball valve member in a direction perpendicular to said axis and adapted to permit the flow of fluid from said inlet conduit to said outlet conduit when said spherical ball valve member is rotated about said axis to an open position;
        (2) an elongated groove adjacent to and connected with each end of said ball port extending into the surface of said spherical ball valve member and extending partially around the circumference of said spherical ball valve member in a common direction away from said port in the plane of rotation of said spherical ball valve member, said grooves having a selected depth and width at the point of intersection with said port thus providing a selected area for fluid flow through said grooves at said point and said area decreasing as said groove extends around said circumference away from said port, thus providing for a reduced area for fluid flow; and
    a diffuser located in said outlet conduit, said diffuser lining said outlet conduit and diverging outwardly from said ball chamber wherein said diffuser is replaceable and is formed of a material harder than said valve housing.

* * * * *